Patented June 12, 1928.

1,673,615

UNITED STATES PATENT OFFICE.

HERMANN BOLLMANN, OF HAMBURG, GERMANY, ASSIGNOR, BY MESNE ASSIGNMENTS, TO MARY FULFORD FOSTER, TRUSTEE, OF WASHINGTON, DISTRICT OF COLUMBIA.

PROCESS OF PURIFYING PHOSPHATIDES.

No Drawing. Application filed July 13, 1925, Serial No. 43,413, and in Germany June 13, 1925.

The present invention relates to an improved process of purifying phosphatides.

In treating oil-seeds and legumes, containing lecithine, especially soy-beans, with alcohol and benzol there are obtained from these materials oil, phosphatides which partly consist of lecithine and are partly insoluble in alcohol, and bitter-matters. After evaporating the solvent the phosphatides and bitter-matters may be separated from the chief bulk of oil by passing steam into the latter. This mixture consisting of phosphatides, bitter-matters, adhering oil, and other impurities was hitherto treated with acetone or alcohol in order to obtain from the said mixture the phosphatides in a pure state and to separate the lecithine from the phosphatides insoluble in alcohol.

The more the phosphatides are purified by washing them with alcohol, the more their tough, wax-like consistency, will be increased, so that it will be extremely difficult to remove the last traces of impurities therefrom.

I have now found by experiments that the said difficulties may be fully overcome by effecting the treatment and purification of the phosphatides in the following manner.

The emulsion composed of phosphatides, oils and bitter-matters is diluted by a mixture of benzol and alcohol, say 10 per cent of benzol and 90 per cent of alcohol of 96 volume per cent; 100 parts of emulsion can be treated with 40 parts of benzol and 360 parts of alcohol. The invention is not restricted to these exact figures. In bringing the said mixed solvent into action upon the said emulsion about 10 per cent of the latter may remain undissolved.

The solution and the undissolved constituent parts obtained by the above procedure are heated to 65° C. until boiling and kept boiling at this temperature for 10 to 15 minutes, whereupon the mass is allowed to stand without further heating.

The original undissolved residue, from which the soluble parts have been separated by the heating, will then settle as a tough smear which is removed. This smear consists of organic phosphatides of a high phosphorus content with a little neutral oil.

The remaining solution is allowed to cool down slowly to 20° C. whereby there are separated about 25 per cent of the original mass which settled materials consist of phosphatides insoluble in alcohol and of neutral oil, free from bitter-matters. The neutral oil may be separated from the phosphatides insoluble in alcohol by washing with acetone.

The now remaining solution is evaporated in a vacuum, e. g. at an absolute pressure of 160 m. m. of mercury, and at 40° C. The residue of evaporation consists of lecithine, neutral oil and impurities such as bitter-matters, coloring matters and the like. This residue can easily be washed with acetone whereby there is obtained a lecithine of extraordinary purity. The thus obtained lecithine amounts to about 30 to 33 per cent of the dry original material.

In order to bring about a still further purification of the solution and of the products obtained therefrom, animal charcoal or any other decolorizing agent may be added during the boiling.

I claim:

1. A process of purifying phosphatides which comprises diluting an emulsion of lecithine, phosphatides insoluble in alcohol, oil, bitter substances and other impurities, with a mixture of benzol and a much larger amount of alcohol, heating the solution carrying the undissolved material to boiling, maintaining the boiling of the solution for some time, removing the solution from the settled smear containing insoluble phosphatides and cooling the former slowly down to about 20° C., removing the residue consisting of phosphatides insoluble in alcohol and free from bitter-matters and neutral oil, evaporating the remaining solution in a vacuum, and in freeing the thus obtained lecithine from the oil and impurities still contained therein by washing it with acetone.

2. In the process of purifying phosphatides according to claim 1, the specific embodiment which consists in diluting the said emulsion with a mixture of about 1 part of benzol and 9 parts of alcohol.

In testimony whereof I affix my signature.

HERMANN BOLLMANN.